(12) United States Patent
Nakanishi et al.

(10) Patent No.: US 8,735,730 B2
(45) Date of Patent: May 27, 2014

(54) TOUCH PANEL AND METHOD OF MANUFACTURING THE SAME

(75) Inventors: Akira Nakanishi, Osaka (JP); Shigeyuki Fujii, Osaka (JP)

(73) Assignee: Panasonic Corporation, Osaka (JP)

( * ) Notice: Subject to any disclaimer, the term of this patent is extended or adjusted under 35 U.S.C. 154(b) by 325 days.

(21) Appl. No.: 13/105,078

(22) Filed: May 11, 2011

(65) Prior Publication Data

US 2011/0285655 A1 Nov. 24, 2011

(30) Foreign Application Priority Data

May 24, 2010 (JP) .................. 2010-118006

(51) Int. Cl.
*H05K 1/03* (2006.01)

(52) U.S. Cl.
USPC .......................... 174/255; 345/173

(58) Field of Classification Search
CPC ..... G06F 3/088; G06F 3/04883; G06F 3/044; G06F 3/04866; G06F 3/045; G06F 3/0416; G06F 3/046
USPC .......................................................... 349/12
See application file for complete search history.

(56) References Cited

U.S. PATENT DOCUMENTS

| | | | |
|---|---|---|---|
| 6,958,748 B1 * | 10/2005 | Fukui et al. | 345/173 |
| 8,400,430 B2 * | 3/2013 | Dunn et al. | 345/176 |
| 2006/0223346 A1 | 10/2006 | Fujii et al. | |
| 2007/0128948 A1 * | 6/2007 | Nakanishi et al. | 439/660 |
| 2009/0284487 A1 | 11/2009 | Nakanishi et al. | |
| 2010/0085320 A1 | 4/2010 | Kuwajima et al. | |
| 2010/0103126 A1 | 4/2010 | Nakamura et al. | |

FOREIGN PATENT DOCUMENTS

| | | |
|---|---|---|
| CN | 1848332 | 10/2006 |
| CN | 201111008 Y | 9/2008 |
| CN | 101598984 | 12/2009 |
| JP | 2009-277121 | 11/2009 |
| JP | 2010-085923 | 4/2010 |
| WO | 2008/117770 | 10/2008 |

OTHER PUBLICATIONS

English Translation of Search Report of Chinese Office Action issued on Jul. 16, 2013.

* cited by examiner

*Primary Examiner* — Ishwarbhai B Patel
(74) *Attorney, Agent, or Firm* — Panasonic Patent Center (57) ABSTRACT

A non-adhering portion where an adhesion layer is removed is provided on a lower surface of a display sheet directly above a connection portion. Even if bulges or recesses occur at the connection portion on an upper substrate owing to fluctuations or differences in thickness when adhering and connecting a wiring board, no bulge or recess occurs on the display sheet. Therefore, it is possible to obtain a touch panel which is easy to see and operate.

11 Claims, 6 Drawing Sheets

TOUCH PANEL AND METHOD OF MANUFACTURING THE SAME

TECHNICAL FIELD

The technical field relates to a touch panel which is used, as one example, for operating various types of electronic equipment, and also to a method of manufacturing the touch panel.

BACKGROUND

Recently, various types of electronic equipment, such as a cellular phone and an electronic camera, have advanced in functions and are becoming diversified. Moreover, such equipment mounted with a light transparent touch panel on a display surface of their display devices, such as liquid crystal display devices, are increasing in number.

Such equipment have been increasing that a user can press the touch panel with a finger or a pen while viewing display on the rear display device through the touch panel in order to make a transfer among their various functions and also those equipment are desired to be easy to see and operate.

Such a conventional touch panel will be described with reference to FIGS. 5 and 6. It is to be noted that the drawings are shown in a partially enlarged size so that a configuration can be understood easily.

Figure 5:
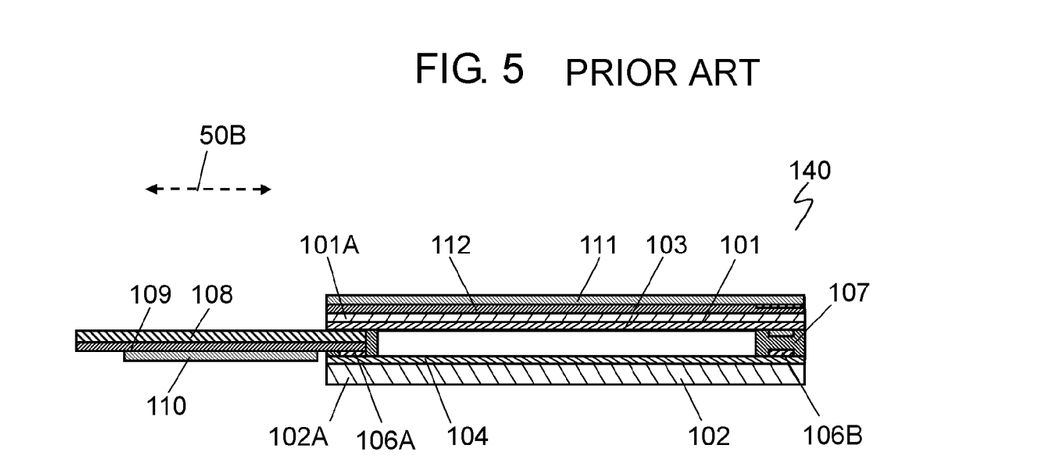
FIG. 5 shows a cross-sectional view of a conventional touch panel.
Figure 6:
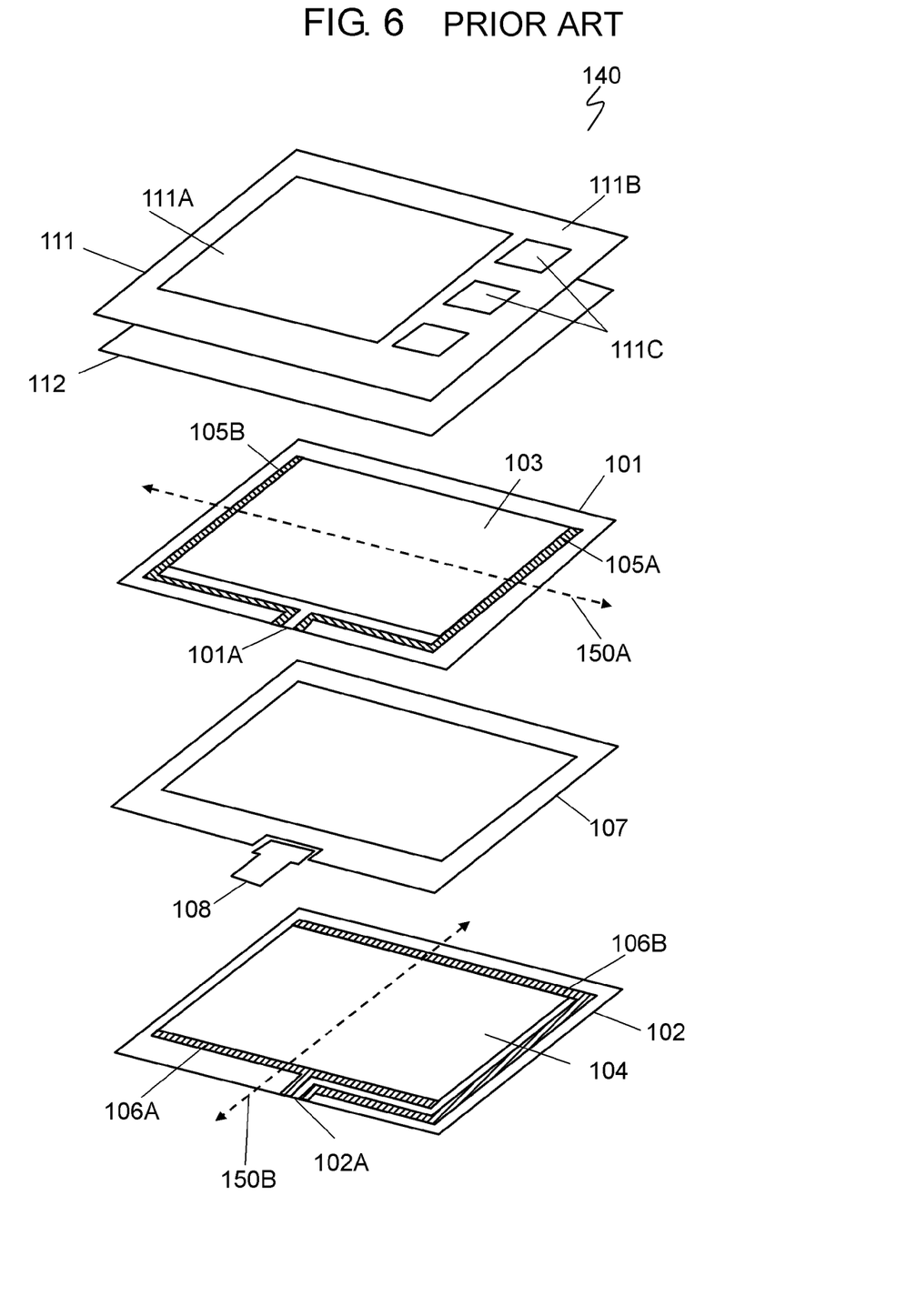
FIG. 6 shows an exploded perspective view of the conventional touch panel.

FIG. 5 is a cross-sectional view of conventional touch panel 140. FIG. 6 is an exploded perspective view of conventional touch panel 140. In FIGS. 5 and 6, conventional touch panel 140 includes film-shaped light transparent upper substrate 101, light transparent lower substrate 102 made of glass or the like, light transparent upper conductive layer 103 made of indium tin oxide formed on a lower surface of upper substrate 101, and lower conductive layer 104 formed on an upper surface of lower substrate 102.

To ends of upper conductive layer 103 in direction 150A, a pair of upper electrodes 105A and 105B are connected, respectively. To ends of lower conductive layer 104 in direction 150B perpendicular to direction 150A, a pair of lower electrodes 106A and 106B are connected, respectively. Upper electrodes 105A and 105B and lower electrodes 106A and 106B are made of a conductive material, such as silver. Upper electrodes 105A and 105B and lower electrodes 106A and 106B extend to connection portions 101A and 102A at peripheral left ends of upper substrate 101 and lower substrate 102, respectively.

On the upper surface of lower conductive layer 104, a plurality of dot spacers made of an insulating resin are formed with predetermined spacing between the dot spacers. A peripheral inner fringe between upper substrate 101 and lower substrate 102 is fitted with roughly frame-shaped spacer 107.

The respective peripheries of upper substrate 101 and lower substrate 102 are adhered to each other with an adhesive agent applied to both or one of the upper and lower surfaces of spacer 107 so that upper conductive layer 103 and lower conductive layer 104 may face each other with a predetermined interval provided between them.

A plurality of wiring patterns 109 are formed on at least one of upper and lower surfaces of film-shaped wiring board 108. Film-shaped cover sheet 110 is adhered to the lower surface of wiring board 108, to cover the plurality of wiring patterns 109 except right and left ends of wiring patterns 109.

A right end of wiring board 108 is held in a condition where it is sandwiched by respective left-end connection portions 101A and 102A of upper substrate 101 and lower substrate 102. A right end of each of wiring patterns 109 is adhered and connected to upper electrodes 105A and 105B and lower electrodes 106A and 106B with a conducting adhesive agent. The conducting adhesive agent may include an anisotropic conducting adhesive agent in which conducting particles are dispersed in a synthetic resin.

Film-shaped display sheet 111 has light transmitting portion 111A, light shielding portion 111B, and operation portion 111C. Light transmitting portion 111A is formed at the middle on a lower surface of display sheet 111. Light transmitting portion 111A is surrounded by light shielding portion 111B painted in a predetermined color and operation portion 111C on which patterns such as characters and symbols are printed. Adhesion layer 112 formed all over the lower surface of display sheet 111 causes display sheet 111 to be adhered to the upper surface of upper substrate 101.

Touch panel 140 having such a configuration is disposed on the display surface of the display device such as a liquid crystal display device and mounted on the electronic equipment. The left ends of the plurality of wiring patterns 109 on wiring board 108 are electrically connected to an electronic circuit of the equipment by using a connector or soldering.

If the upper surface of light transmitting portion 111A or the upper surface of operation portion 111C on display sheet 111 is pressed with a finger or a pen in response to display on the display device disposed on the lower surface of lower substrate 102 of touch panel 140, upper substrate 101 below display sheet 111 bends. The pressed position on upper conductive layer 103 comes in contact with lower conductive layer 104. A voltage is sequentially applied to the pair of upper electrodes 105A and 105B and the pair of lower electrodes 106A and 106B through the plurality of wiring patterns 109 on wiring board 108 from the electronic circuit. The pressed position is detected by the electronic circuit based on a ratio between a difference in potential across upper conductive layer 103 and a difference in potential across lower conductive layer 104, thereby switching various functions of the equipment.

In condition where a plurality of menus, for example, are displayed on the display device disposed on the lower surface of lower substrate 102 of touch panel 140, an operator presses light transmitting portion 111A or operation portion 111C on a desired option of the menus. The operated position is detected by the electronic circuit via the plurality of wiring patterns 109 on wiring board 108. The operator can select and decide on the desired one of the plurality of menus.

Figure 7A:
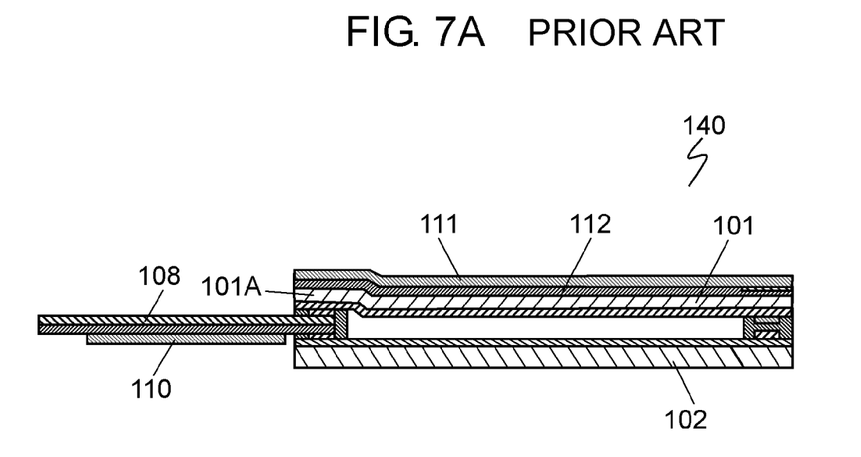
FIGS. 7A and 7B show cross-sectional views of the conventional touch panel.
Figure 7B:
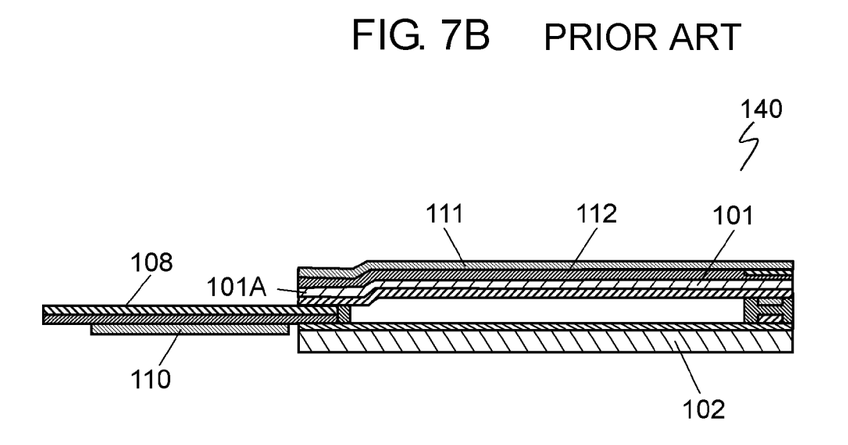

FIGS. 7A and 7B are cross-sectional views of conventional touch panel 140.

In such conventional touch panel 140, irregularities occur in such a manner as to cause a wave portion at a left end of display sheet 111 as shown in FIGS. 7A and 7B. Accordingly, there are some cases where display on the display device of touch panel 140 cannot be seen clearly through light transmitting portion 111A.

A touch panel similar to touch panel 140 is disclosed in Unexamined Japanese Patent Publication No. 2009-277121.

SUMMARY

A touch panel according to a present embodiment includes a display sheet, an adhesion layer provided on a lower surface of the display sheet, an upper substrate adhered to the lower surface of the display sheet via the adhesion layer, an upper conductive layer provided on a lower surface of the upper substrate, an upper electrode connected to the upper conductive layer, a lower conductive layer facing the upper conductive layer, a lower substrate provided on a lower surface of the lower conductive layer, a lower electrode connected to the lower conductive layer, a wiring board having plural wiring patterns, and a connection portion that connects the upper electrode and the lower electrode to the wiring patterns of the wiring board. The lower surface of the display sheet has a non-adhesive portion exposed from the adhesion layer. The non-adhesive portion of the lower surface of the display sheet faces an upper surface of the connection portion.

A touch panel body which includes the upper substrate, the upper conductive layer, the upper electrode, the lower conductive layer, the lower substrate, the lower electrode, the wiring board, and the connection portion is provided. The touch panel can be manufactured by adhering the lower surface of the display sheet to the upper surface of the upper substrate of the touch panel body via the adhesion layer after the touch panel body is prepared.

The touch panel according to the present embodiment avoids the occurrence of a wave portion as described above in the prior art. Accordingly, the touch panel according to the present embodiment is easy to see and operate.

DETAILED DESCRIPTION OF PREFERRED EMBODIMENTS

Figure 1:
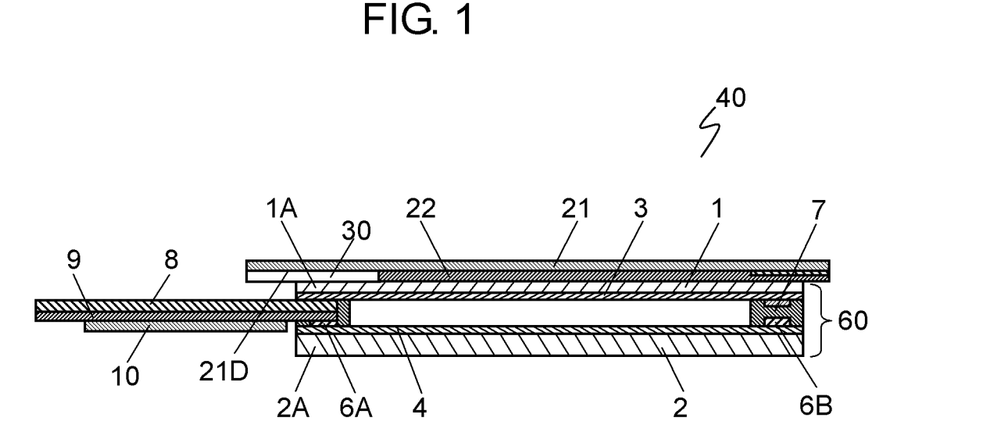
FIG. 1 shows a cross-sectional view of a touch panel according to an embodiment.
Figure 2:
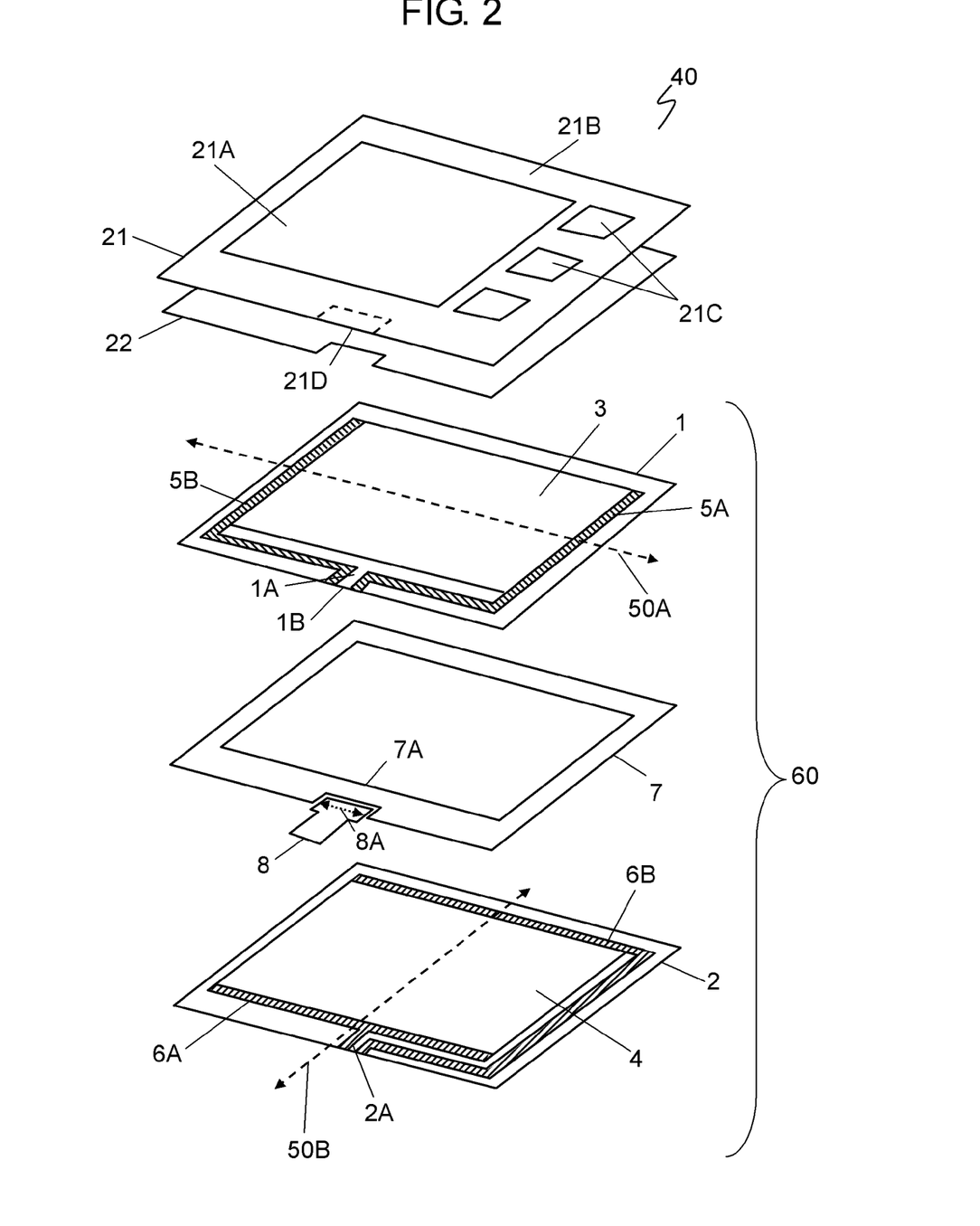
FIG. 2 shows an exploded perspective view of the touch panel according to the embodiment.

FIG. 1 is a cross-sectional view of touch panel 40 according to an exemplary embodiment. FIG. 2 is an exploded perspective view of touch panel 40 according to the embodiment. A description will be given of a configuration of touch panel 40 in FIGS. 1 and 2.

Touch panel 40 is composed of touch panel body 60 and display sheet 21 adhered to the touch panel body 60.

Upper substrate 1 and lower substrate 2 have a film shape and are made of light transmitting insulating material. The insulating material may be polyethylene terephthalate, polyether sulfone, polycarbonate, or the like. Lower substrate 2 may be a thin plate made of an insulating material, such as glass.

On a lower surface of upper substrate 1 and an upper surface of lower substrate 2, upper conductive layer 3 and lower conductive layer 4, respectively, are formed by sputtering or the like. Upper conductive layer 3 and lower conductive layer 4 are made of a light transmitting conducting material, such as indium tin oxide or tin oxide.

To two opposite ends of upper conductive layer 3 in direction 50A, a pair of upper electrodes 5A and 5B are connected, respectively. To two opposite ends of lower conductive layer 4 in direction 50B perpendicular to direction 50A, a pair of lower electrodes 6A and 6B are connected, respectively. Upper electrodes 5A and 5B and lower electrodes 6A and 6B are made of a conductive material, such as silver or carbon. Upper electrodes 5A and 5B and lower electrodes 6A and 6B extend to connection portions 1A and 2A at peripheral left ends of upper substrate 1 and lower substrate 2, respectively. Upper electrodes 5A and 5B are electrically connected to upper conductive layer 3, and lower electrodes 6A and 6B are electrically connected to lower conductive layer 4.

Further, on an upper surface of lower conductive layer 4, a plurality of dot spacers made of an insulating resin, such as epoxy or silicone, are formed with predetermined spacing between the dot spacers. A peripheral inner fringe between upper substrate 1 and lower substrate 2 is fitted with roughly frame-shaped spacer 7 made of an insulating material, such as polyester, epoxy, or unwoven cloth. The respective peripheries of upper substrate 1 and lower substrate 2 are adhered to each other with an adhesive agent such as acrylic or rubber applied and formed on both or one of upper and lower surfaces of spacer 7 so that a lower surface of upper conductive layer 3 and an upper surface of lower conductive layer 4 may face each other with a predetermined interval provided between the layers 3 and 4.

Wiring board 8 is like a film made of polyimide or polyethylene terephthalate. A plurality of wiring patterns 9 made of copper foil, silver, or carbon are formed on at least one of upper and lower surfaces of wiring board 8. Further, film-shaped cover sheet 10 is adhered to the lower surface of wiring board 8, to cover the plurality of wiring patterns 9 except right and left ends of wiring patterns 9.

A right end of wiring board 8 is held in condition where it is sandwiched between respective left-end connection portions 1A and 2A of upper substrate 1 and lower substrate 2. A right end of each of wiring patterns 9 is adhered and electrically connected to upper electrodes 5A and 5B and lower electrodes 6A and 6B with a conducting adhesive agent. The conducting adhesive agent may include an anisotropic conducting adhesive agent in which conductive particles including gold-plated nickel or resin are dispersed in a synthetic resin, such as epoxy, acrylic, or polyester. Touch panel body 60 includes upper substrate 1, lower substrate 2, upper conductive layer 3, lower conductive layer 4, upper electrodes 5A and 5B, lower electrodes 6A and 6B, spacer 7, wiring board 8, wiring patterns 9, and cover sheet 10.

Display sheet 21 adhered to an upper surface of upper substrate 1 of touch panel body 60 is like a film made of polyethylene terephthalate. Outer dimensions of display sheet 21 are slightly larger than those of upper substrate 1 and lower substrate 2. A periphery of display sheet 21 projects outward from upper substrate 1 and lower substrate 2.

Display sheet 21 has light transmitting portion 21A, light shielding portion 21B, operation portion 21C, and non-adhesive portion 21D. Light transmitting portion 21A is formed at a center on a lower surface of display sheet 21. Light transmitting portion 21A is surrounded by light shielding portion 21B painted in a predetermined color and operation portion 21C on which patterns, such as characters and symbols, are printed.

Adhesion layer 22 formed of an insulating adhesive agent made of acrylic or rubber is formed on the lower surface of display sheet 21. Adhesion layer 22 adheres display sheet 21 to the upper surface of upper substrate 1 of touch panel body 60.

The lower surface of display sheet 21 has non-adhesive portion 21D exposed from adhesion layer 22. Non-adhesive portion 21D of the lower surface of display sheet 21 faces an upper surface of connection portions 1A. It is to be noted that, under the lower surface of display sheet 21, adhesion layer 22 does not exist directly above the upper surfaces of connection portions 1A and 2A so that the lower surface of display sheet 21 may be exposed. Non-adhesive portion 21D is a part of the lower surface of display sheet 21 where adhesion layer 22 does not exist. Non-adhesive portion 21D is a portion of the lower surface of display sheet 21 which does not have adhesion layer 22 thereon.

Touch panel 40 having such a configuration is disposed on a display surface of the display device, such as a liquid crystal display device, and mounted on electronic equipment. Further, the left ends of the plurality of wiring patterns 9 on wiring board 8 are electrically connected to an electronic circuit in the equipment by using a connector or soldering.

In this configuration, an operator presses the upper surface of light transmitting portion 21A or that of operation portion 21C of display sheet 21 with a finger or a pen in response to display on the display device disposed on the lower surface of lower substrate 2 of touch panel 40. Upper substrate 1 below display sheet 21 bends, so that at the pressed position, upper conductive layer 3 comes in contact with lower conductive layer 4.

Then, a voltage is sequentially applied to the pair of upper electrodes 5A and 5B and the pair of lower electrodes 6A and 6B through the plurality of wiring patterns 9 on wiring board 8 from the electronic circuit. The pressed position is detected by the electronic circuit based on a ratio between a difference in potential across upper conductive layer 3 in direction 50A and a difference in potential across lower conductive layer 4 in direction 50B, thereby switching various functions of the equipment.

In condition where a plurality of menus, for example, are displayed on the display device disposed on the lower surface of lower substrate 2 of touch panel 40, the operator presses light transmitting portion 21A or operation portion 21C on a desired option of the menus. The operated position is detected by the electronic circuit via the plurality of wiring patterns 9 on wiring board 8. In such a manner, the operator can select and decide on the desired one of the plurality of menus.

The following will describe a method for manufacturing touch panel 40.

First, the pair of upper electrodes 5A and 5B and the pair of lower electrodes 6A and 6B are formed by printing etc. on upper substrate 1 and lower substrate 2, respectively, the upper substrate having the lower surface having the upper conductive layer 3 made of indium tin oxide or the like formed thereon and the lower substrate 2 having the upper surface having lower conductive layer 4 formed thereon.

Then, in condition where the right end of wiring board 8 on which an anisotropic conducting adhesive agent is applied is sandwiched between connection portions 1A and 2A, upper substrate 1 and lower substrate 2 are adhered to spacer 7 so that upper conductive layer 3 and lower conductive layer 4 may face each other with a predetermined interval provided between layers 3 and 4. Then, upper substrate 1, lower substrate 2, and connection portions 1A and 2A are heated and pressed, to adhere and connect wiring patterns 9 on wiring board 8 to upper electrodes 5A and 5B and lower electrodes 6A and 6B, thereby providing touch panel body 60. Then, display sheet 21 is adhered to the upper surface of upper substrate 1 of touch panel body 60 with adhesion layer 22 formed on the lower surface of display sheet 21, thereby completing touch panel 40.

That is, first touch panel body 60 is heated and pressed, and then display sheet 21 is adhered to the upper surface of upper substrate 1 of touch panel body 60. Not heating and pressing of display sheet 21 provides an advantage to prevent display sheet 21 from waving. That is, the detrimental occurrence of a waving portion being formed on the display sheet 21 is avoided according to the present embodiment by preventing the heating and pressing of the display sheet 21. Touch panel according to the present invention is not limited to touch panels including a display sheet which is not heated and pressed.

Conventional touch panel 140 shown in FIGS. 7A and 7B has fluctuations in thickness of upper electrodes 105A and 105B on the lower surface of upper substrate 101 and lower electrodes 106A and 106B on the upper surface of lower substrate 102 as well as that of spacer 107 etc. Accordingly, when connection portions 101A and 102A are heated and pressed to adhere and connect wiring board 108, the fluctuations in thickness may give bulges or recesses to connection portion 101A at the left end of upper substrate 101.

Further, the thickness may be different between a position where upper electrodes 105A and 105B as well as lower electrodes 106A and 106B are formed and a position where none of them is formed. Therefore, when connection portions 101A and 102A are heated and pressed to adhere and connect wiring board 108, the differences in thickness may give bulges or recesses to connection portion 101A at the left end of upper substrate 101.

In FIG. 7A, if connection portion 101A at the left end of upper substrate 101 has bulges due to the fluctuations or differences in thickness, such bulge causes another bulge at the left end of display sheet 111 adhered to the upper part of connection portion 101A in condition where it faces this portion.

Further, in FIG. 7B, if connection portion 101A at the left end of upper substrate 101 has recesses due to the fluctuations or differences in thickness, such recess causes another recess at the left end of display sheet 111 adhered to the upper part of connection portion 101A in condition where it faces this portion.

In such a manner, if display sheet 111 has bulges or recesses at its left end, the left end of display sheet 111 may wave. As a result of such waved portion, it may become difficult to see the display on the display device of touch panel 140 through light transmitting portion 111A.

Figure 3A:
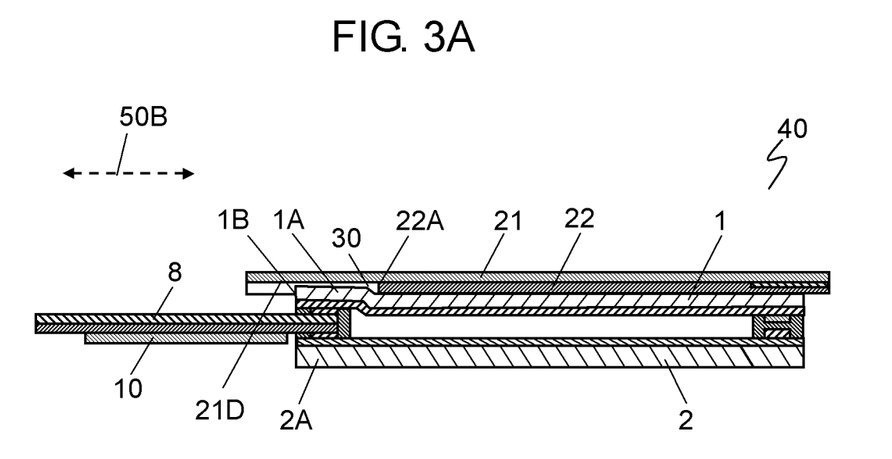
FIGS. 3A and 3B show cross-sectional views of the touch panel according to the embodiment.
Figure 3B:
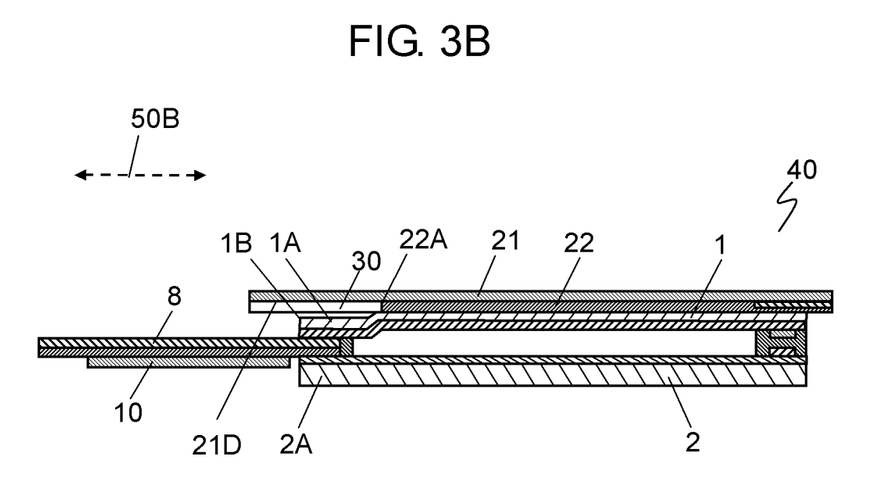

FIGS. 3A and 3B are cross-sectional views of touch panel 40 according to the present embodiment.

In the embodiment, non-adhesive portion 21D is provided where the lower surface of display sheet 21 is exposed because adhesion layer 22 is removed from the lower surface of display sheet 21 directly above the upper surfaces of the connection portions 1A and 2A. Non-adhesive portion 21D may not be adhered and connected to the upper surface of connection portion 1A when display sheet 21 is adhered to the upper surface of upper substrate 1 via adhesion layer 22. In FIGS. 3A and 3B, gap 30 is provided between the upper surface of connection portion 1A and non-adhesive portion 21D of the lower surface of display sheet 21. That is, non-adhesive portion 21D is located away from connection portion 1A via gap 30.

Therefore, even if bulges occur on connection portion 1A at the left end of upper substrate 1, the bulges is absorbed by gap 30, so that no bulge occurs at the left end of display sheet 21 directly above connection portion 1A. Further, even if recesses occur at connection portion 1A at the left end of upper substrate 1, no recess occurs at the left end of display sheet 21 directly above connection portion 1A because non-adhesive portion 21D is not adhered or connected to the upper surface of connection portion 1A.

In each of two directions 50A and 50B which are different from each other and which are parallel to the lower surface of display sheet 21, a width of gap 30 formed between non-adhesive portion 21D and the upper surface of connection portion 1A may preferably be larger than that of non-adhesive portion 21D. For example, in direction 50A shown in FIG. 2, a width of gap 30 may preferably be larger than that of a width 8A of wiring board 8. In direction 50B, a width of gap 30 may preferably be larger than that of a width from end 7A of inner fringe of spacer 7 to end 1B of upper substrate 1. In such a manner, it is possible to secure an effect of preventing bulges or recesses from occurring at the left end of display sheet 21 directly above connection portion 1A even if bulges or recesses occur at any position on connection portion 1A.

Figure 4:
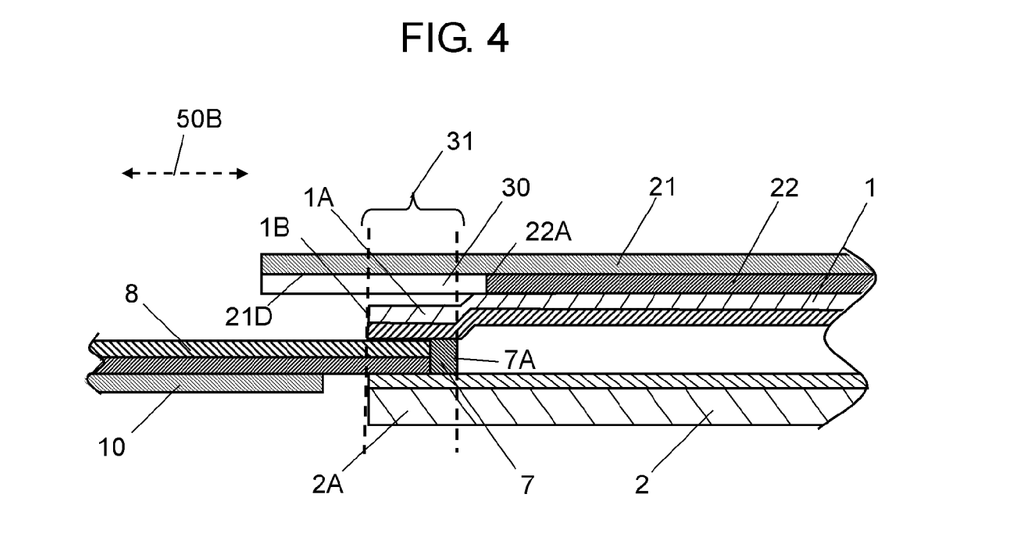
FIG. 4 shows a partially enlarged cross-sectional view of the touch panel according to the embodiment.

FIG. 4 is a partially enlarged cross-sectional view of touch panel 40 according to the embodiment. In FIG. 4, space 31 is a space from end 1B to end 7A and directly above the upper surfaces of connection portions 1A and a part of spacer 7 which faces connection portion 1A. Preferably, adhesion layer 22 may not exist space 31. In direction 50B, end 22A of space 31 approximating to connection portion 1A may not exist directly above connection portion 1A. Also in such a manner, it is possible to secure the effect of preventing bulges or recesses from occurring at the left end of display sheet 21 directly above connection portion 1A even if bulges or recesses occur at any position on connection portion 1A.

Therefore, even if bulges or recesses occur at connection portion 1A of upper substrate 1 owing to fluctuations or differences in thickness of the components, no bulge or recess occurs on display sheet 21, thereby preventing the left end from waving. Accordingly, the display on the display device of touch panel 40 can be seen easily through light transmitting portion 21A, thereby facilitating the operations.

It is to be noted that the fluctuations or differences in thickness may be about several micrometers in each of the components but might be about 10 through 30 micrometers if they are combined. Therefore, preferably, adhesion layer 22 may have a thickness of about 50 micrometers and gap 30 having roughly the same thickness of adhesion layer 22 is formed between the lower surface of display sheet 21 and the upper surface of connection portion 1A.

The outer dimensions of display sheet 21 may be larger than upper substrate 1 and lower substrate 2 so that its periphery may project outward from upper substrate 1 and lower substrate 2. In such an arrangement, it is possible also to adhere and mount touch panel 40 to a housing of the equipment by using adhesion layer 22 on the lower surface of this periphery.

It is to be noted that although touch panel 40 in the present embodiment has been of a resistance type of detecting operations based on a difference in potential, it may be of a different type such as an electrostatic type of detecting the operations based on a change in electrostatic capacitance.

In the present embodiment, non-adhesive portion 21D is provided where the lower surface of display sheet 21 is exposed because adhesion layer 22 is removed from the lower surface of display sheet 21 directly above connection portions 1A and 2A. Since non-adhesive portion 21D is not adhered or connected to connection portion 1A when adhering and connecting wiring board 8, display sheet 21 has no bulge or recess even if bulges or recesses occur at connection portion 1A of upper substrate 1 owing to fluctuations or differences in thickness. Therefore, it is possible to obtain touch panel 40 which is easy to see and operate.

What is claimed is:

1. A touch panel comprising:
   a display sheet;
   an adhesion layer provided on a lower surface of the display sheet;
   an upper substrate adhered to the lower surface of the display sheet via the adhesion layer;
   an upper conductive layer provided on a lower surface of the upper substrate;
   an upper electrode connected to the upper conductive layer;
   a lower conductive layer having an upper surface that faces a lower surface of the upper conductive layer with a predetermined interval provided between the upper surface of the lower conductive layer and the lower surface of the upper conductive layer;
   a lower substrate provided on a lower surface of the lower conductive layer;
   a lower electrode connected to the lower conductive layer;
   a spacer made of an insulating material and fitting a peripheral inner fringe between the upper substrate and the lower substrate;
   a wiring board having a plurality of wiring patterns; and
   a connection portion that connects the upper electrode and the lower electrode to the plurality of wiring patterns of the wiring board, wherein
   the lower surface of the display sheet has a non-adhesive portion exposed from the adhesion layer,
   the non-adhesive portion of the lower surface of the display sheet faces an upper surface of the connection portion, and
   the non-adhesive portion includes a space directly above the upper surface of the connection portion and a part of the spacer which faces the connection portion.

2. The touch panel according to claim 1, wherein the adhesion layer does not exist directly above the upper surface of the connection portion.

3. The touch panel according to claim 1, wherein the non-adhesive portion is located away from the connection portion via a gap.

4. The touch panel according to claim 3, wherein a width of the gap is larger than a width of the connection portion in each of two directions which are different from each other and which are parallel to the lower surface of the display sheet.

5. The touch panel according to claim 1, wherein a gap is provided between the upper surface of the connection portion and the non-adhesive portion of the lower surface of the display sheet.

6. The touch panel according to claim 1, wherein outer dimensions of the display sheet are larger than outer dimensions of the upper substrate and the lower substrate.

7. The touch panel according to claim 1, wherein a periphery of the display sheet projects outward from the upper substrate and the lower substrate.

8. A touch panel comprising:
   a touch panel body which includes
      an upper substrate,
      an upper conductive layer provided on a lower surface of the upper substrate,
      an upper electrode connected to the upper conductive layer,
      a lower conductive layer having an upper surface that faces a lower surface of the upper conductive layer with a predetermined interval provided between the upper surface of the lower conductive layer and the lower surface of the upper conductive layer,
      a lower substrate provided on a lower surface of the lower conductive layer,
      a lower electrode connected to the lower conductive layer,
      a spacer made of an insulating material and fitting a peripheral inner fringe between the upper substrate and the lower substrate,
      a wiring board having a plurality of wiring patterns, and a connection portion that connects the upper electrode and the lower electrode to the plurality of wiring patterns of the wiring board;

an adhesion layer; and a display sheet having a lower surface configured to be adhered to an upper surface of the upper substrate of the touch panel body via the adhesion layer after the touch panel body is fabricated, wherein the lower surface of the display sheet has a non-adhesive portion exposed from the adhesion layer, the non-adhesive portion of the lower surface of the display sheet is configured to face an upper surface of the connection portion, and the non-adhesive portion includes a space directly above the upper surface of the connection portion and a part of the spacer which faces the connection portion.

9. The touch panel according to claim 8, wherein a gap is provided between the upper surface of the connection portion and the non-adhesive portion of the lower surface of the display sheet.

10. The touch panel according to claim 8, wherein outer dimensions of the display sheet are larger than outer dimensions of the upper substrate and the lower substrate.

11. The touch panel according to claim 8, wherein a periphery of the display sheet projects outward from the upper substrate and the lower substrate.

* * * * *